United States Patent
Park (10) Patent No.: US 9,453,612 B2
(45) Date of Patent: Sep. 27, 2016

(54) SAFETY VALVE TO RELEASE EXCESS PRESSURE FROM PORTABLE GAS CONTAINER FOR PREVENTION OF EXPLOSION

(71) Applicant: DAE RYUK CAN CO., LTD., Seoul (KR)

(72) Inventor: Bong June Park, Seoul (KR)

(73) Assignee: DAE RYUK CAN CO., LTD., Seoul (KR)

( * ) Notice: Subject to any disclaimer, the term of this patent is extended or adjusted under 35 U.S.C. 154(b) by 277 days.

(21) Appl. No.: 14/247,313

(22) Filed: Apr. 8, 2014

(65) Prior Publication Data

US 2015/0114493 A1   Apr. 30, 2015

(30) Foreign Application Priority Data

Oct. 25, 2013   (KR) .................. 10-2013-0127536

(51) Int. Cl.
*F17C 13/04* (2006.01)
*F16K 17/04* (2006.01)
*B65D 83/70* (2006.01)

(52) U.S. Cl.
CPC .............. *F17C 13/04* (2013.01); *B65D 83/70* (2013.01); *F16K 17/04* (2013.01); *F17C 2201/0119* (2013.01); *F17C 2201/058* (2013.01); *F17C 2205/0329* (2013.01); *F17C 2205/0332* (2013.01); *F17C 2205/0385* (2013.01); *F17C 2205/0391* (2013.01); *F17C 2221/035* (2013.01); *F17C 2260/042* (2013.01); *F17C 2270/0709* (2013.01); *F17C 2270/0718* (2013.01); *Y10T 137/7841* (2015.04)

(58) Field of Classification Search
CPC ....... F17C 13/123; F17C 13/04; F16K 17/04
See application file for complete search history.

(56) References Cited

U.S. PATENT DOCUMENTS 6,814,097 B2 * 11/2004 Girouard ................. F16K 17/04
137/72

FOREIGN PATENT DOCUMENTS

| KR | 20030042852 | 6/2003 |
| KR | 20040070560 | 8/2004 |
| KR | 100914620 | 9/2009 |

* cited by examiner

*Primary Examiner* — Craig Schneider
*Assistant Examiner* — Nicole Wentlandt
(74) *Attorney, Agent, or Firm* — Mark M. Friedman (57) ABSTRACT

There is provided a safety valve to release excess pressure from a portable gas container for the prevention of an explosion, wherein, when the internal pressure of a portable butane gas container increases over certain level, the safety valve instantaneously operates to release the excess pressure gas from the container at once through an excess pressure gas outlet, thereby sufficiently lowering the pressure inside the container to prevent the container from exploding.

6 Claims, 8 Drawing Sheets

SAFETY VALVE TO RELEASE EXCESS PRESSURE FROM PORTABLE GAS CONTAINER FOR PREVENTION OF EXPLOSION

CROSS-REFERENCE TO RELATED APPLICATION

This application claims the benefit of Korean Patent Application No. 2013-0127536, filed Oct. 25, 2013, the disclosure of which is hereby incorporated herein by reference in its entirety.

BACKGROUND OF THE INVENTION

1. Field of the Invention

The present invention relates to a safety valve of a portable gas container and more particularly, to a safety valve to release the excess pressure from a portable gas container for the prevention of an explosion, wherein, when the internal pressure of a portable butane gas container increases over certain level, the safety valve instantaneously operates to release the excess pressure gas from the container at once through an excess pressure gas outlet, thereby sufficiently lowering the pressure inside the container to prevent the explosion of the container.

2. Description of the Related Art

In general, portable gas containers include a portable butane gas container charged with a butane mixture having a butane gas among liquid petroleum gases as a main ingredient, which is used for a portable gas range, and aerosol containers, such as hair spray, insecticide, lacquer spray, etc., which use a liquid petroleum gas, etc. as a propellant. These portable gas containers discharge the contents to the outside by using the gas pressure within the containers. When these containers are charged with the contents, the pressure over certain level always exists in the containers.

When a butane gas container receives high heat during the distribution process or upon use, the pressure of the liquid gas contained in the butane gas container increases to explode the container. Especially, in the butane gas container used for a portable gas range, when a user uses it without following the safety regulations or when high temperature or pressure over certain level is applied to it, the internal pressure increases so that the container may deform or explode. Therefore, the pressure which the portable gas container endures, deforms and bursts is defined by law.

Technology exists for a safety valve to release an excess pressure gas of a portable gas container, thereby operating to prevent the explosion of the container when the pressure within the container reaches over certain level, Korean Patent Registration No. 431590 relates to an "apparatus for preventing the explosion of a portable gas range" and Korean Patent Registration No. 515120 relates to a "safety apparatus for excess pressure in a gas fuel container". However, these have some realistic problems in that assembly work is difficult and they do not properly operate at set pressure. Therefore, the applicant/inventor of the present invention has conducted much research and development to solve the problems of the prior art. As a result, the applicant/inventor obtained the following patents: Korean Patent Registration No. 914620 for a "safety valve for a portable gas container", Korean Patent Registration No. 1064633 for a "safety valve for a portable gas container", Korean Patent Registration No. 1281536 for a "safety valve for a portable gas container, functioning to prevent excess pressure", and Korean Patent Registration No. 1292010 for a "safety valve for a portable gas container". The applicant/inventor still continues the relevant research and development at great time and expense. In addition to the foregoing, the applicant/inventor has developed and commercialized some technology to prevent the explosion of a portable butane gas container.

However, many butane gas containers with the safety valves as produced and distributed have the problem in that the safety valves fail to be opened at once to instantaneously release the excess pressure gas at once when the gas pressure in the container reaches to certain level. Furthermore, since a little bit of gas may leak between the mounting cup and the gasket, it causes a problem such as fire, etc.

SUMMARY OF THE INVENTION

Therefore, it is an object of the present invention to provide a safety valve to release any excess pressure from a portable gas container for the prevention of an explosion, wherein a valve stem housing to be installed in a mounting cup of a portable butane gas container is integrally formed with a safety valve housing and the safety valve housing is formed in a multiple cylinder shape. When the internal pressure of the gas container increases over a certain level, the safety valve installed in the safety valve housing instantaneously opens to release any excess pressure gas of the container at once to the outside through an excess pressure gas outlet formed at the mounting cup, thereby sufficiently lowering the internal pressure of the container to prevent the explosion of the gas container.

In accordance with an embodiment of the present invention, there is provided a safety vale to release excess pressure from a portable gas container for the prevention of an explosion, comprising: a safety valve housing with first and second diameter portions integrally formed in a cylindrical shape, the first and second diameter portions being different from each other in diameter; a shaft with a body, a top projection formed on a top of the body, a gas outflow portion and a gasket locking portion formed at a lower part of the body, the shaft positioned inside the safety valve housing; a stopper with a lower part being open, an upper part being closed except for a center where a through-hole is vertically formed, and a side wall vertically formed along the edge of the upper part to provide a space where the gas releases, wherein the stopper is positioned so that the through-hole receives the top projection and the outer circumferential surface of the side wall is secured to the inner circumferential surface of the first diameter portion of the safety valve housing; a spring fitted around the body of the shaft and positioned between the gas outflow portion of the shaft and the stopper; and a first gasket positioned between the first diameter portion of the safety valve housing and an excess pressure gas outlet 13 of the mounting cup; and a second gasket positioned to be received around the gasket locking portion 323 formed at the lower part of the shaft, so that an upper part of the second gasket is secured to a lower part of the gas outflow portion.

Preferably, the second gasket further comprises: a top side being open, a body with a bottom side being closed and a side wall being formed upwardly in a cylindrical shape, along the edge of the bottom side, and a protruding portion of the upper part of the second gasket having a circular cross section being formed at an upper end of the side wall.

Preferably, the first diameter portion of the safety valve housing has a greater diameter than the second diameter portion and the first and second diameter portions are formed with a slope therebetween. When the pressure of the gas charged in the gas container is normal, the bottom side of the second gasket is positioned to seal an opening formed on a lower part of the second diameter portion of the safety valve housing and when the second gasket is forced to move upwardly, to the maximum, by the excess pressure gas in the gas container, the protruding portion of the second gasket moves from the upper part of the second diameter portion.

Preferably, the shaft and the stopper further comprise: vertically penetrating grooves formed at the equidistant intervals on the gas outflow portion of the shaft and the side wall of the stopper, respectively, to release the excess pressure gas.

Preferably, the second gasket comprises: separable structures of a first unit and a second unit. When the pressure of the gas in the container is normal, the first unit in an O-ring shape is positioned between the gas outflow portion and the gasket locking portion of the shaft so that its outer circumferential surface is secured to the inner circumferential surface of the second diameter portion of the safety valve housing; and the second unit is positioned under the gasket locking portion of the shaft, to seal the hole formed on the bottom of the second diameter portion of the safety valve housing.

BRIEF DESCRIPTION OF THE DRAWINGS

The above and other features and advantages of the present invention will become more apparent to those of ordinary skill in the art by describing in detail preferred embodiments thereof with reference to the attached drawings in which.

[Description of numbers for constituents in drawings]

| | |
|---|---|
| 10: mounting cup | 11: notch |
| 13: excess pressure gas outlet | |
| 20: valve stem housing | 21: protruding support unit |
| 30: safety valve | 31: safety valve housing |
| 32: shaft | 33: spring |
| 34: stopper | 35: first gasket |
| 36: second gasket | |

DETAILED DESCRIPTION OF THE PREFERRED EMBODIMENT

The present invention will now be described more fully hereinafter with reference to the accompanying drawings, in which a preferred embodiment of the invention is shown so that those of ordinary skill in the art can easily carry out the present invention.

The technical features of a safety valve to release excess pressure from a portable gas container for the prevention of an explosion according to the present invention are: A safety valve housing integrally formed with a valve stem housing is manufactured in a multiple cylinder shape, thereby sufficiently releasing an excess pressure gas from the container at once, to sufficiently lower the internal pressure of the container. Further, the location of an excess pressure gas outlet of the safety valve is arranged to be perpendicular to the line which connects the center of a mounting cup and a notch of the mounting cup. Therefore, when the valve stem housing and the safety valve housing integrally formed are injection-molded, it is possible to form a number of cavities in a mold in the same size, thereby remarkably reducing manufacturing cost.

Figure 1:
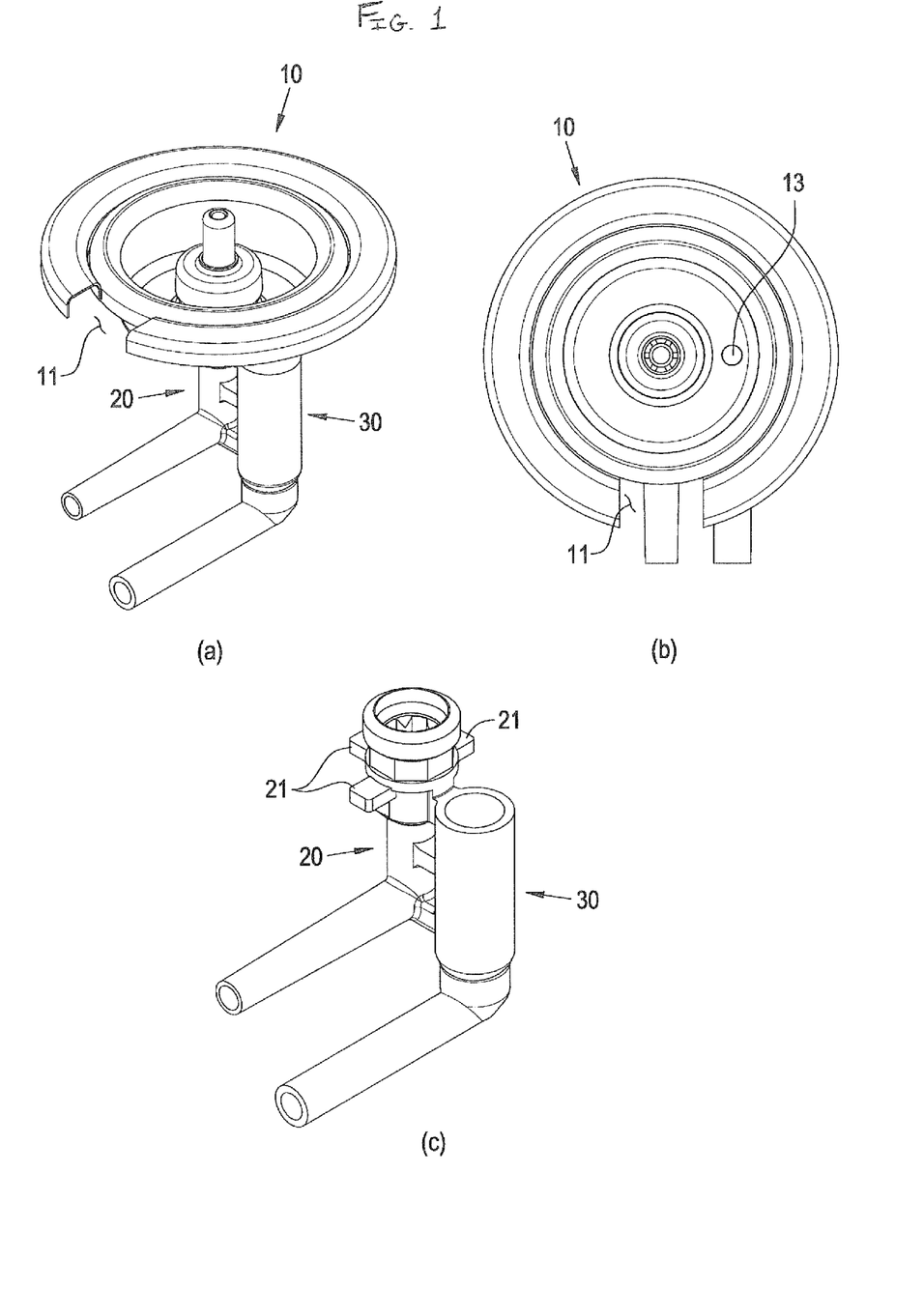
FIG. 1 shows a valve stem housing, a safety valve housing, and a mounting cup where the valve stem housing and the safety valve housing are installed.
Figure 2:
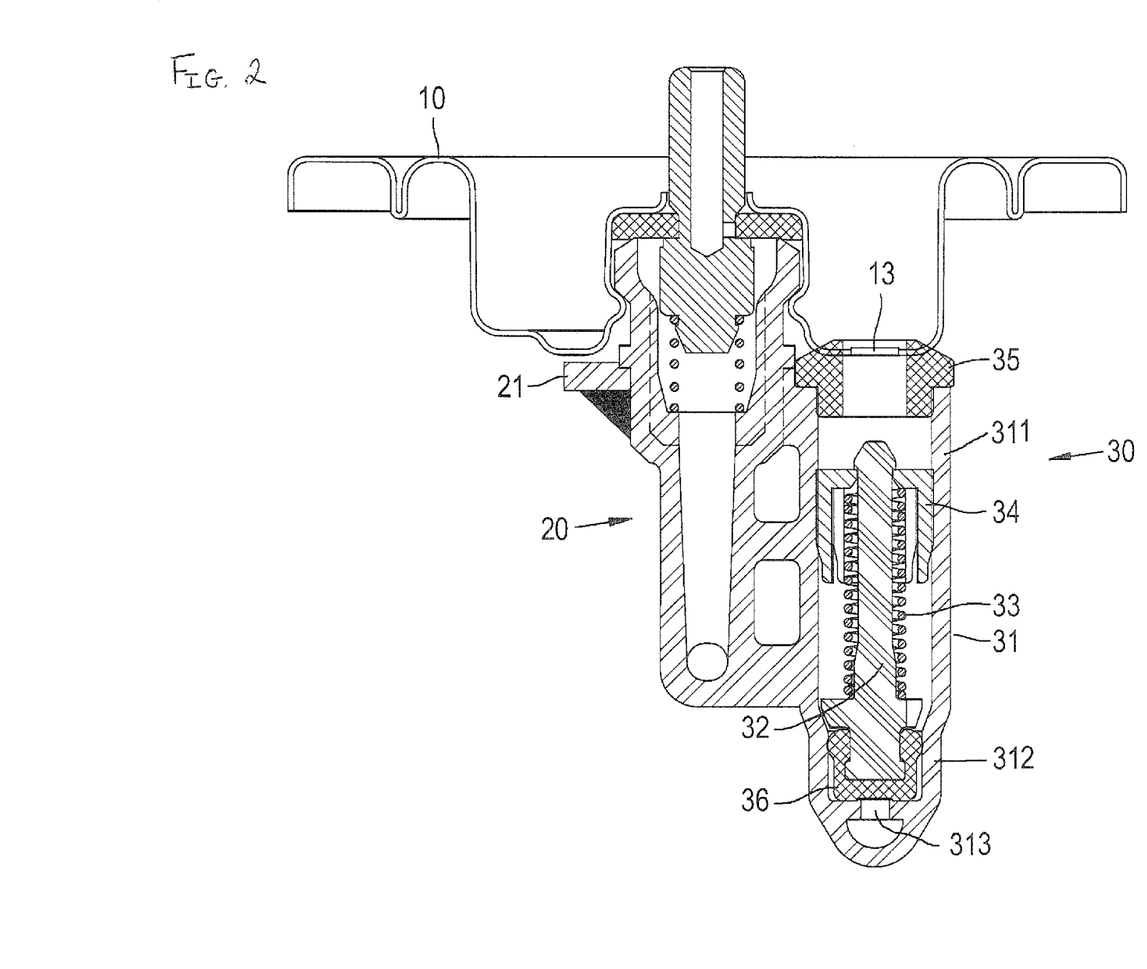
FIG. 2 is a cross-sectional view of the valve stem housing and the safety valve housing.

In this application, the "safety valve 30" means to include all of a safety valve housing 31, a shaft 32, a spring 33, a stopper 34, a first gasket 35 and a second gasket 36. The "safety valve housing 31" means a cylindrical shape having a first diameter portion 311 and a second diameter portion 312. The location of an excess pressure gas outlet 13 is described as being arranged on the right or left of the center of a mounting cup 10, to be perpendicular to the line connecting the center of the mounting cup 10 and a notch 11. This arrangement is most desirable in terms of the manufacturing cost when injection-molding the valve stem housing and safety valve housing. Even if the excess pressure gas outlet 13 is not positioned on the right or left of the center of the mounting cup, it may be arranged between the excess pressure gas outlet 13 and the notch 11 as shown in FIGS. 1 (a) and (b).

The gas container where the safety valve 30 is installed comprises: a valve stem housing 20 and a safety valve housing 31 as integrally formed. The excess pressure gas outlet 13 formed in the mounting cup 10 is positioned on the right or left of the center of the mounting cup 10 which is perpendicular to the line connecting the center of the mounting cup 10 and the notch 11 (referring to FIG. 1). Since the excess pressure gas outlet 13 is positioned in this manner and the valve stem housing 20 and the safety valve housing 31 are integrally formed <referring to FIG. 1 (c)>, it is possible to form a number of cavities in a mold in the same size upon the injection-molding and therefore it is possible to remarkably reduce the manufacturing cost.

The portable gas container charged with the butane gas discharges the gas through a valve stem which is installed through the center of the mounting cup 10 connected to the top of the container. When the pressure in the container becomes higher than predetermined pressure, the excess pressure gas within the container is instantaneously and sufficiently released to the outside through the safety valve 30 of the present invention so that the pressure inside the container sufficiently lowers. The safety valve 30 basically comprises: the safety valve housing 31, the shaft 32 positioned in the safety valve housing 31, the stopper 34 fitted around a top end of the shaft 32, the spring 33 fitted around a body of the shaft 32, and first and second gaskets 35, 36 to prevent the leak of the gas.

The safety valve housing 31 has the first diameter portion 311 and the second diameter portion 312 which are different from each other in diameter. The first and second diameter portions 311, 312 are integrally formed. The constituent elements of the safety valve 30 are all arranged in the safety valve housing 31. The diameter of the first diameter portion 311 is greater than that of the second diameter portion 312. The first and second diameter portions 311, 312 are formed with a slope therebetween. An opening 313 to release the excess pressure gas is formed at a lower part of the second diameter portion 312.

Figure 4:
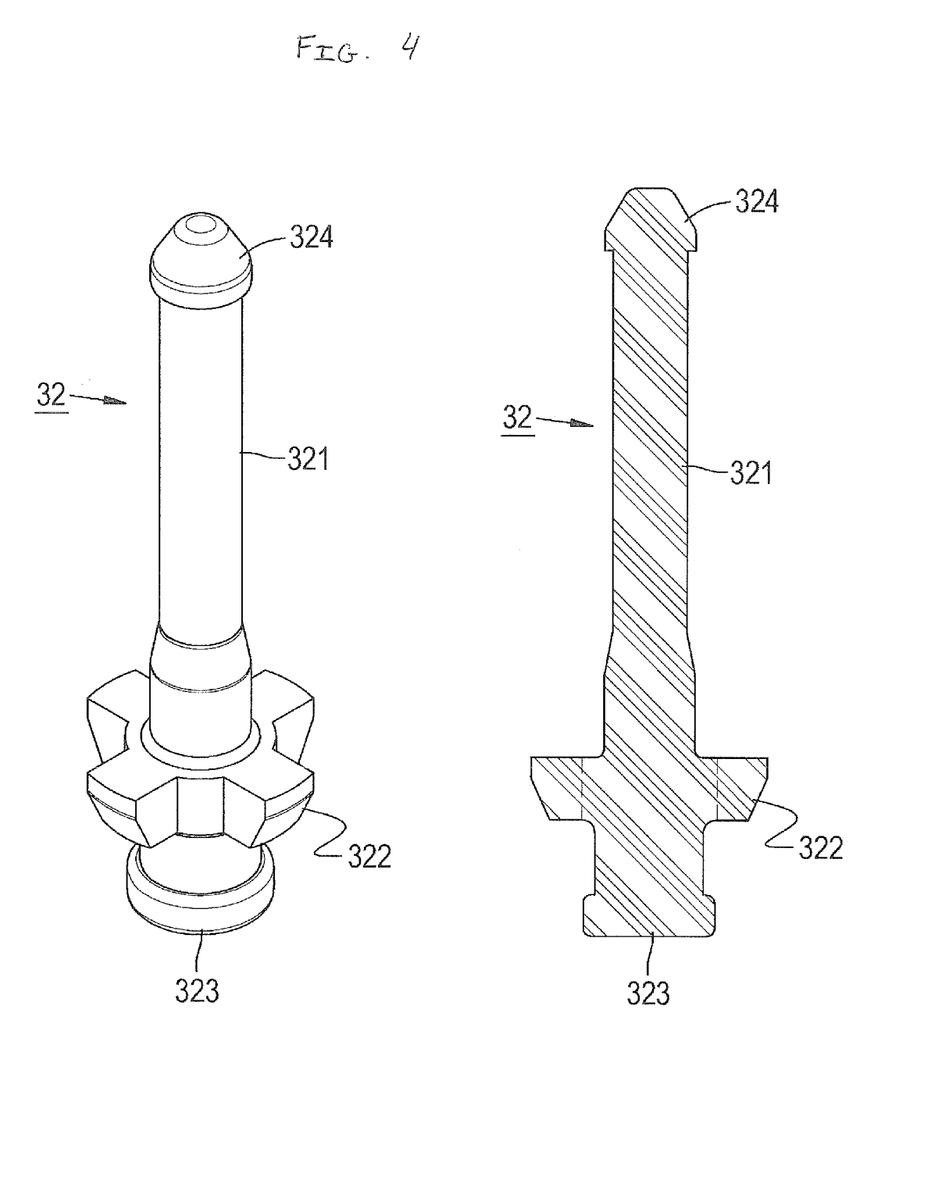
FIG. 4 shows a shaft of the safety valve.

The shaft 32 is made of synthetic resin. The body 321 of the shaft 32 is made as a single shaft, to be positioned over the first and second diameter portions 311, 312 of the safety valve housing 31. A top projection 324 is formed at a top of the body 321. A gas outflow portion 322 and a gasket locking portion 323 are formed at a lower part of the body 321. The gas outflow portion 322 needs a passage (space) to release the excess pressure gas. The passage through which the excess pressure gas releases may preferably include vertically penetrating grooves. These vertically penetrating grooves are each formed at the equidistant intervals, along the cylindrical surface of the edge of the gas outflow portion 322 (referring to FIG. 4).

The diameter of the shaft 32 varies with the diameter of the shaft 32 above the gas outflow portion 322 being greater than the diameter of the shaft 32 under the top projection 324. That is, the shaft 32 is formed such that the greater diameter of the body 321 of the shaft 32 is the same as the inner diameter of the spring 33, to secure the spring 33 when the body 321 of the shaft 32 receives the spring 33. Therefore, even though the spring 33 is compressed, it is able to maintain its position around the body 321 of the shaft 32.

Figure 5:
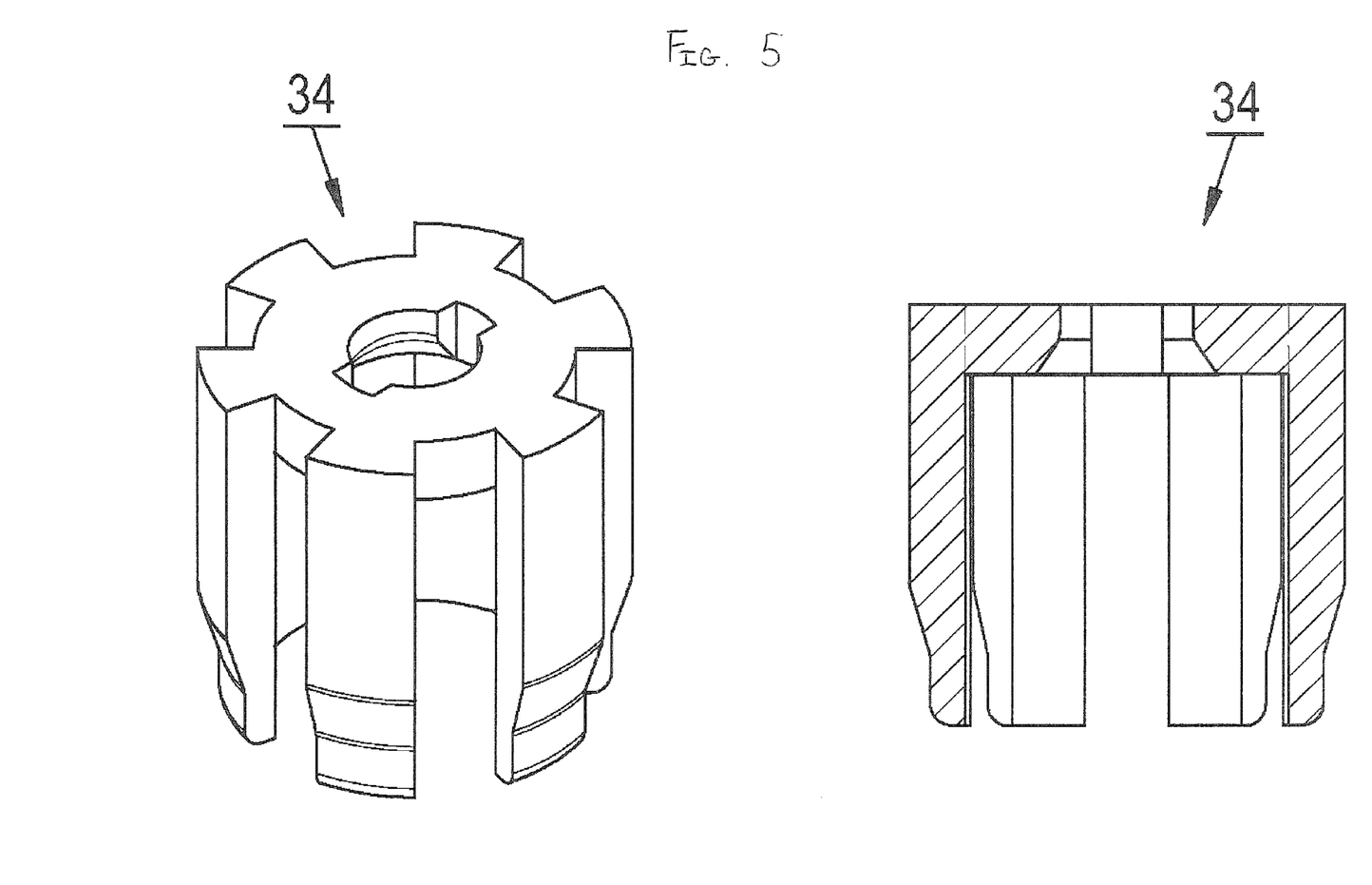
FIG. 5 shows a stopper of the safety valve.
Figure 6:
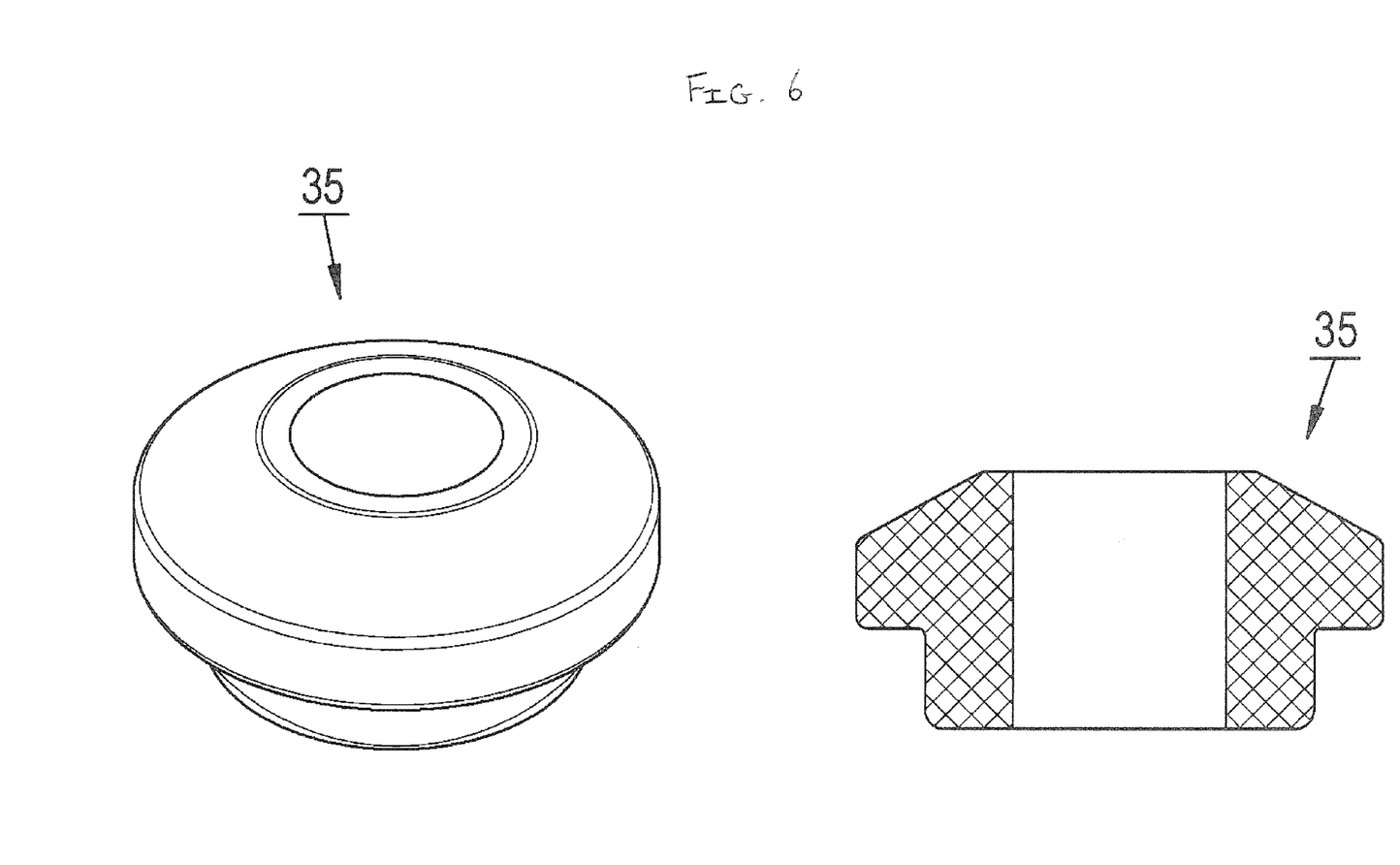
FIG. 6 shows a first gasket of the safety valve.

The stopper 34 is made of synthetic resin. As shown in FIG. 5, a lower part of the stopper 34 is open. A through-hole is vertically formed in the center of a closed upper part of the stopper 34. A side wall is vertically formed, along the edge of the upper part of the stopper 34. Vertically penetrating grooves which are the passages (space) to release the gas are formed at the equidistant intervals at the side wall. The outer circumferential surface of the side wall of the stopper 34 is positioned to be secured to the inner circumferential surface of the first diameter portion 311 of the safety valve housing 31. The upper part of the shaft 32 insertedly penetrates the through-hole formed in the center of the upper part of the stopper 34. Since the top projection 324 protrudes in the upper part of the body 321 of the shaft 32 (referring to FIG. 4), even though the shaft 32 vertically moves, the shaft 32 inserted into the through-hole formed in the upper part of the stopper 34 does not leave the stopper 34. That is, the shaft 32 is vertically movable, being inserted into the stopper 34. Further, since the shaft 32, spring 33, stopper 34 and the second gasket 36 are assembled before these are inserted into the safety valve housing 31, it is easy to keep.

The spring 33 is fitted around the outer circumferential surface of the body 321 of the shaft 32, to be positioned between the gas outflow portion 322 of the shaft 32 and the upper part of the stopper 34. When the pressure inside the container is normal, the elasticity of the spring 33 pushes the shaft 32 downwardly so that the second gasket 36 is secured to the center of the bottom of the second diameter portion 312 of the safety valve housing 31, thereby preventing the gas which tends to flow out through the opening 313 from flowing out.

The first gasket 35 is made of a kind of rubber having elasticity. The first gasket 35 is inserted between an upper end of the first diameter portion 311 of the safety valve housing 31 and the excess pressure gas outlet 13 of the mounting cup 10, to seal so that the gas inside the container cannot leak or escape through the excess pressure gas outlet 13.

Figure 7:
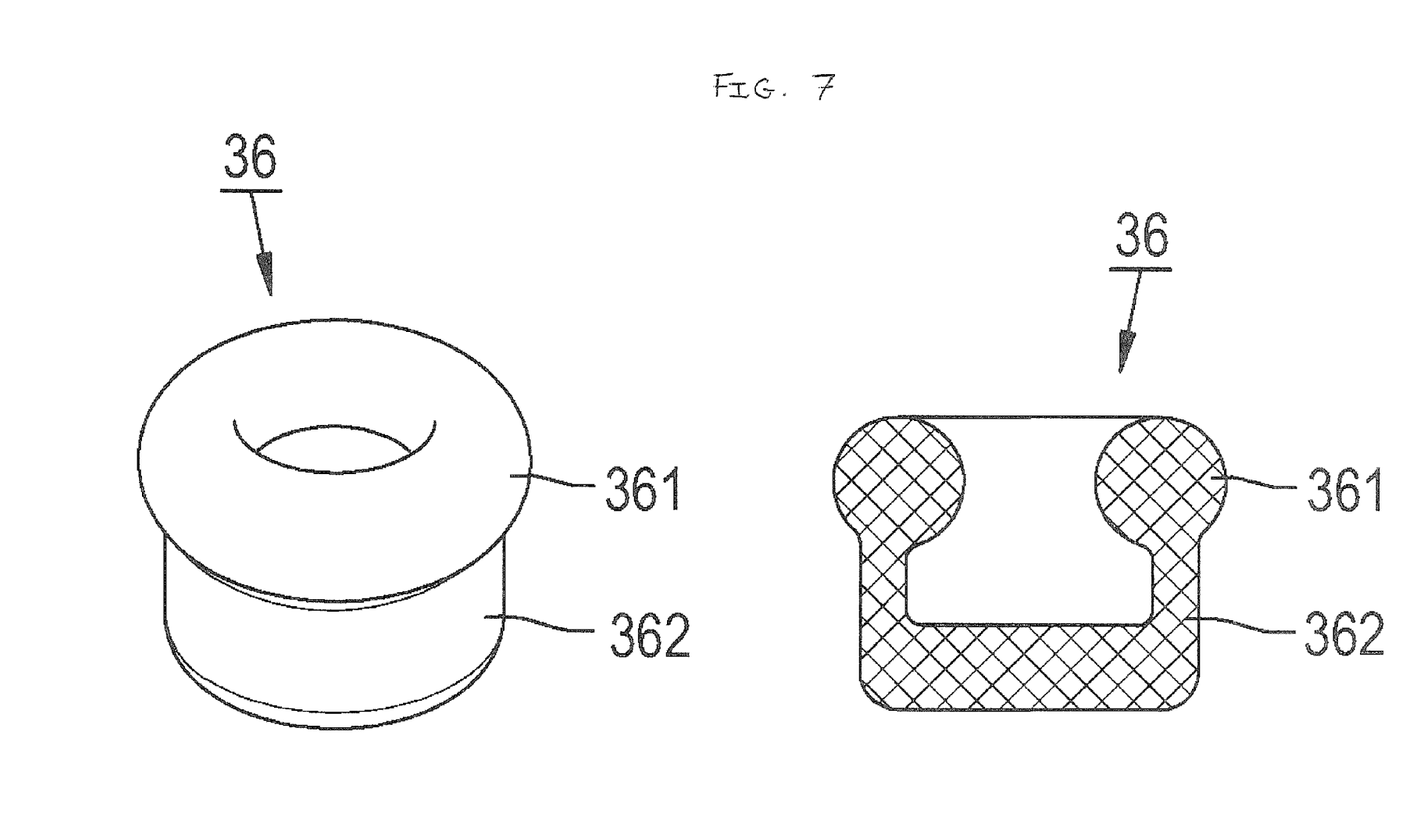
FIG. 7 shows a second gasket of the safety valve.

The second gasket 36 is made of a kind of rubber having elasticity. A body 362 of the second gasket 36 has a bottom side being closed and a top side being open. A side wall is formed upwardly in a cylindrical shape, along the edge of the bottom side. A protruding portion 361 having a circular cross section is formed at an upper end of the side wall (referring to FIG. 7) (However, the cross section of the protruding portion may be in a D-shape instead of the circular shape.)

The body 362 of the second gasket 36 is positioned around the gasket locking portion 323 formed at the lower part of the shaft 31. As the part protruding inwardly from the protruding portion 361 of the second gasket 36 is fitted into a gap between the gas outflow portion 322 and the gasket locking portion 323, the upper end of the protruding portion 361 is positioned to be secured to the lower side of the gas outflow portion 322.

When the pressure of the gas charged in the gas container is normal, the second gasket 36 seals double since the bottom side of the body 362 of the second gasket 36 closes the opening 313 formed on the lower part of the second diameter portion 312 and the protruding portion 361 comes into contact with the inner circumferential surface of an upper part of the second diameter portion 312 of the safety valve housing 31. However, when the second gasket 36 operates by the excess pressure gas in the gas container and it is forced to move upwardly to the maximum, the second gasket operates so that the protruding portion 361 of the second gasket 36 moves from the upper part of the second diameter portion 312 of the safety valve housing 31.

Furthermore, when the excess pressure gas occurs in the container, the protruding portion 361 at the upper end of the second gasket 36, which seals the upper part of the inner circumferential surface of the second diameter portion 312 of the safety valve housing 31, separates from the inner circumferential surface of the second diameter portion 312. Then, since the area receiving the pressure of the excess pressure gas increases (that is, the entire lower side of the body of the second gasket is pressed) and much greater force is applied, the shaft 32 being locked with the second gasket 36 moves up. Then, the protruding portion 361 of the second gasket 36 moves from the upper part of the second diameter portion 312 and moves until the spring 33 is compressed to the maximum, making a sufficient space where the excess pressure gas can release. Then, the excess pressure gas instantaneously sufficiently releases at once to enough lower the pressure inside the container.

Figure 8:
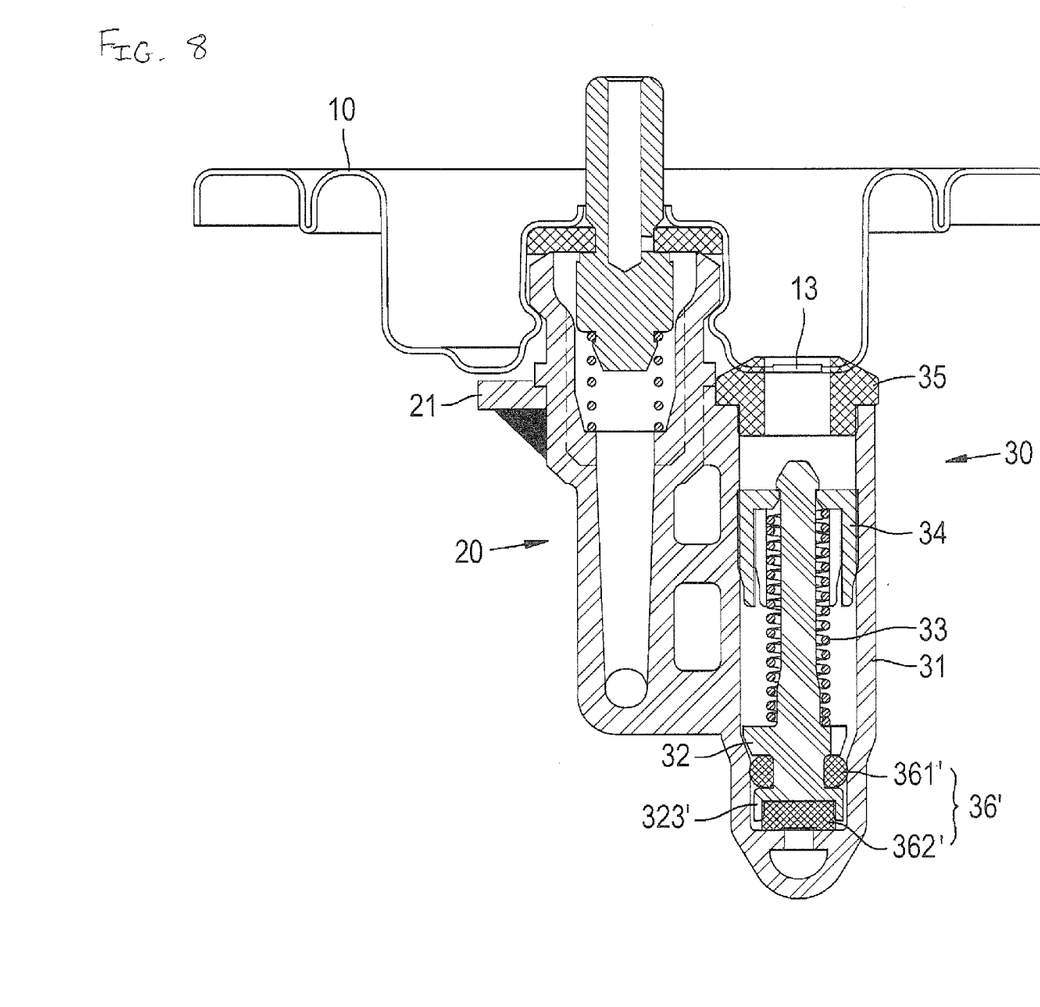
FIG. 8 is a cross-sectional view of a safety vale according to a modified version of an embodiment of the present invention.

FIG. 8 shows a safety valve with a second gasket 36' according to a modified version of the embodiment of the present invention. The second gasket 36' is separated into two constitutions, a first unit 361' and a second unit 362': The first unit 361' has an O-ring shape (The cross-section of the O-ring shape may not be circular and it may be in a D-shape.) When the internal pressure of the container is normal, the first unit 361' is inserted between the gas outflow portion 322 and the gasket locking portion 323' of the shaft 32, so that its outer circumferential surface is secured to the inner circumferential surface of the second diameter portion 312 of the safety valve housing 31. The second unit 362' is to seal the opening 313 formed on the lower part of the second diameter portion 312 of the safety valve housing 31. Since the rest of the description is the same as that of the second gasket 36 described above, no further description is presented.

Another characteristic constitution of the present invention is that a plurality (properly, about three (3)) of protruding support units 21 are formed to protrude outwardly at an upper part of the outer circumferential surface of the valve stem housing 20. When the valve stem housing 20 and the safety valve 30 are installed to the mounting cup 10, since the plurality of the protruding support units 21 come into contact with the lower side of the mounting cup 10, these support to maintain the sealing condition of the first gasket 36 which seals the gap between the upper end of the safety valve housing 31 and the excess pressure gas outlet 13 formed in the mounting cup 10 in any situations or conditions.

Figure 3:
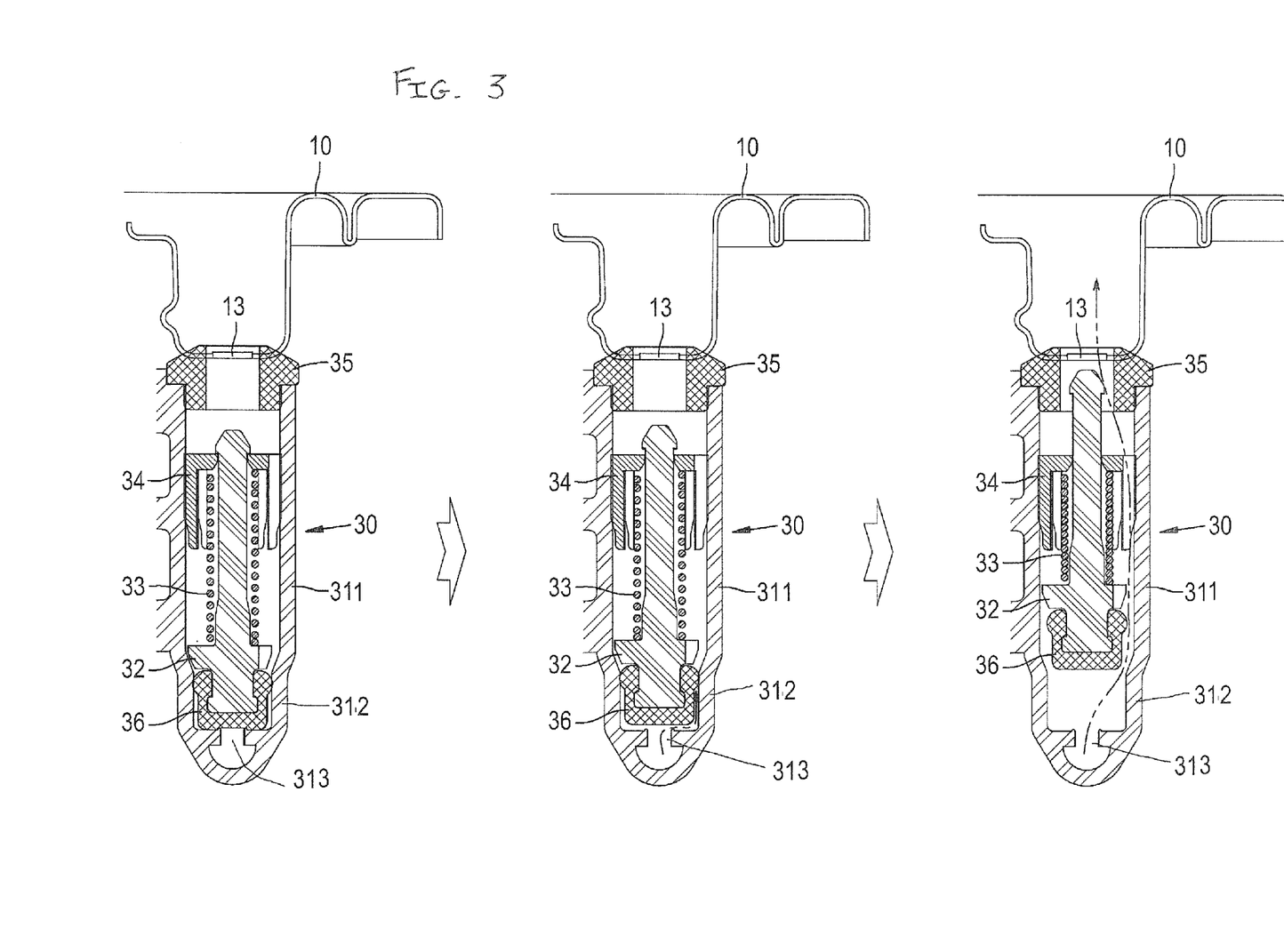
FIG. 3 illustrates a process of releasing excess pressure gas when a safety valve operates.

FIG. 3 illustrates the operational mechanism of the safety valve for the gas container according to the present invention. When the pressure of the gas inside the container is normal, the shaft 32 is pushed downwardly by the elasticity of the spring 33 in the initial stage, so that the second gasket 36 is secured to the bottom of the second diameter portion 312 of the safety valve housing 31, to seal the opening 313 and prevent the gas inside the container from flowing out through the opening 313.

After that, when the pressure of the gas inside the container gradually increases and therefore the second gasket 36 positioned at the lower position of the shaft 32 is slightly pushed upwardly, since the cross-sectional area of the second diameter portion 312 is greater than the opening 313 formed on the lower part of the second diameter portion 312 of the safety valve housing 31, the area under the body 362 of the second gasket 36, which is pressed by the gas, increases. Therefore, as the force which the shaft 32 receives by the gas pressure increases, the second gasket 36 is pushed to the upper part of the second diameter portion 312 of the safety valve housing 31. In the first diameter portion 311, since its diameter is greater than that of the second diameter portion 312, the excess pressure gas sufficiently instantaneously releases at once, to sufficiently lower the pressure inside the container.

The excess pressure gas hardly releases before the protruding portion 361 of the second gasket 36 is pushed to the upper part of the second diameter portion 312 of the safety valve housing 31. However, as soon as the protruding portion 361 of the second gasket 36 passes the upper part of the second diameter portion 312 of the safety valve housing 31, the inner diameter of the safety valve housing 31 increases and the passage to release the gas increases, so that the excess pressure gas is temporally sufficiently released. Accordingly, the pressure inside the gas container drops below the set pressure and the gas container returns to the normal state. The safety valve 30 according to the present invention operates in this manner. After the excess pressure gas is once released, the pressure inside the container does not keep a dangerous condition around the set pressure unlike the conventional safety valve. The safety valve 30 according to the present invention lowers the pressure inside the container to within a safe range.

In the safety valve to release the excess pressure from the portable gas container for the prevention of an explosion according to the present invention, since the safety valve housing is formed in the multiple cylinder shape, the area which the excess pressure gas comes into contact with the lower side of the second gasket increases and therefore the force which the second gasket receives from the excess pressure gas increases, to sufficiently and instantaneously release the excess pressure gas inside the container at once and to sufficiently lower the pressure inside the container. In addition, since the protruding support units are formed at the valve stem housing, these support units support to prevent the safety valve housing from tilting to one side, so that the first gasket positioned between the safety valve housing and the mounting cup can always keep the compressed condition. This prevents the liquid gas from leaking between the excess pressure gas outlet of the mounting cup and the first gasket.

Further, in accordance with the safety valve of the present invention, the excess pressure gas outlet is positioned to the right or left of the center of the mounting cup, which is perpendicular to the line connecting the center of the mounting cup and the notch. Therefore, when the valve stem housing and the safety valve housing as integrally formed are injection-molded, it is possible to form a number of cavities in the mold in the same size, to remarkably reduce the manufacturing cost. In addition, all constituent elements of the safety valve are assembled in advance and inserted in the safety valve housing. In this regard, assembling is simple and productivity is very high.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A safety valve (30) to release excess pressure from a portable gas container for the prevention of an explosion, in which a gas is discharged through a valve stem installed to penetrate a center of a mounting cup (10) connected to a top of the container and when the pressure inside the container is higher than a predetermined pressure, an excess pressure gas is released to the outside through the safety valve (30), the safety valve (30) comprising:

a safety valve housing (31) with first and second diameter portions (311, 312) integrally formed in a cylindrical shape, the first and second diameter portions (311, 312) being different from each other in diameter;

a shaft (32) with a body (321), a top projection (324) formed on a top of the body (321), a gas outflow portion (322) and a gasket locking portion (323) formed at a lower part of the body (321), the shaft (32) positioned inside the safety valve housing (31);

a stopper (34) with a lower part being open, an upper part being closed except for a center where a through-hole is vertically formed, and a side wall vertically formed along an edge of the upper part to provide a space where the gas releases, wherein the stopper (34) is positioned so that the through-hole receives the top projection (324) and an outer circumferential surface of the side wall is secured to an inner circumferential surface of the first diameter portion (311) of the safety valve housing (31);

a spring (33) fitted around the body (321) of the shaft (32) and positioned between the gas outflow portion (322) of the shaft (32) and the stopper (34):

a first gasket (35) mounted on the safety valve housing and positioned between the first diameter portion (311) of the safety valve housing (31) and an excess pressure gas outlet (13) of the mounting cup (10), and a second gasket (36) positioned to be received around the gasket locking portion (323) formed at the lower part of the shaft (32), so that an upper part of the second gasket (36) is secured to a lower part of the gas outflow portion (322), wherein a valve stem housing (20) and the safety valve housing (31) are integrally formed and the excess pressure gas outlet (13) formed in the mounting cup (10) is positioned to the right or left of the center of the mounting cup (10), which is to be perpendicular to a line connecting the center of the mounting cup (10) and a notch (11).

2. The safety valve according to claim 1, wherein the second gasket (36) comprises: a top side being open, a body (362) with a bottom side being closed and a side wall being formed upwardly in a cylindrical shape, along the edge of the bottom side, and a protruding portion (361) of the upper part of the second gasket (36) having a circular cross section being formed at an upper end of the side wall.

3. The safety valve according to claim 1, wherein the first diameter portion (311) of the safety valve housing (31) has a greater diameter than the second diameter portion (312), the first and second diameter portions (311, 312) of the safety valve housing (31) are formed with a slope therebetween, when the pressure of the gas charged in the gas container is normal, a bottom side of the second gasket (36) is positioned to seal an opening (313) formed on the lower part of the second diameter portion (312) of the safety valve housing (31), when the second gasket (36) is forced to move upwardly, to a maximum, by the excess pressure gas in the gas container, a protruding portion (361) of the second gasket (36) moves from the upper part of the second diameter portion (312) of the safety valve housing (31).

4. The safety valve according to claim 1, wherein the shaft (32) and the stopper (34) further comprise: vertically penetrating grooves formed at an equidistant intervals on the gas outflow portion (322) of the shaft (32) and the side wall of the stopper (34) respectively, to release the excess pressure gas.

5. The safety valve according to claim 1, wherein the second gasket (36') comprises separable structures:
   a first unit (361') in an O-ring shape inserted between the gas outflow portion (322) and the gasket locking portion (323') of the shaft (32) so that its outer circumferential surface is secured to the inner circumferential surface of the second diameter portion (312) of the safety valve housing (31); and
   a second unit (362') positioned under the gasket locking portion (322) of the shaft (32), to seal an opening (313) formed on the lower part of the second diameter portion (312) of the safety valve housing (31).

6. The safety valve according to claim 1, further comprising:
   protruding support units (21) formed to protrude outwardly at an upper part of the outer circumferential surface of the valve stem housing (20).

\* \* \* \* \*